(12) United States Patent
Hannes et al.

(10) Patent No.: US 11,979,633 B2
(45) Date of Patent: *May 7, 2024

(54) HYBRID DATA COLLECTION SYSTEM TO CREATE AN INTEGRATED DATABASE OF CONNECTED AND DETAILED CONSUMER VIDEO VIEWING DATA IN REAL-TIME

(71) Applicant: Kovue Systems, Washington, DC (US)

(72) Inventors: Martin Hannes, Washington, DC (US); Hyekyu Lee, Burbank, CA (US)

(73) Assignee: KOVUE SYSTEMS LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,564

(22) Filed: Dec. 14, 2020

(65) Prior Publication Data

US 2021/0352368 A1 Nov. 11, 2021

Related U.S. Application Data

(60) Provisional application No. 62/947,093, filed on Dec. 12, 2019.

(51) Int. Cl.
*H04N 21/235* (2011.01)
*H04L 51/10* (2022.01)
*H04L 51/52* (2022.01)
*H04L 67/561* (2022.01)
*H04N 21/25* (2011.01)
*H04N 21/45* (2011.01)

(52) U.S. Cl.
CPC ......... *H04N 21/4532* (2013.01); *H04L 51/10* (2013.01); *H04L 51/52* (2022.05); *H04L 67/561* (2022.05); *H04N 21/2353* (2013.01); *H04N 21/251* (2013.01)

(58) Field of Classification Search
CPC ...................................................... H04N 21/20
See application file for complete search history.

(56) References Cited

U.S. PATENT DOCUMENTS

| 8,732,605 | B1* | 5/2014 | Falaki | G06Q 30/02 715/780 |
| 9,204,197 | B2* | 12/2015 | Kim | H04N 21/4756 |
| 9,432,720 | B2* | 8/2016 | Kruglick | G11B 27/10 |
| 11,375,256 | B1* | 6/2022 | Dorner | G06N 3/0454 |
| 2012/0030587 | A1* | 2/2012 | Ketkar | H04N 21/47 715/751 |

(Continued)

*Primary Examiner* — Mushfikh I Alam
(74) *Attorney, Agent, or Firm* — McCarter & English, LLP; James M. Smedley; Alex Korona

(57) ABSTRACT

The present invention relates generally to a very sophisticated system and software to collect a large range of hybrid user dam in relation to viewing of video content on any viewing platforms including television, online and other forms systems available on a real-time basis. Specifically, embodiments of the present invention provide systems and software for hybrid data collection and storage for large numbers of different data types and complex output analyses instantaneously. Further, because of the single source of the user data, system data outputs are already, and uniquely, in a verified (and validated) form and there are no requirements of additional verification or validations procedures such as identity (or device) graphing.

20 Claims, 6 Drawing Sheets

(56) References Cited

U.S. PATENT DOCUMENTS

| | | | | |
|---|---|---|---|---|
| 2013/0061261 A1* | 3/2013 | Pakula | H04N 21/6131 | 725/32 |
| 2013/0268973 A1* | 10/2013 | Archibong | G06Q 50/01 | 709/204 |
| 2013/0278828 A1* | 10/2013 | Todd | H04N 21/2343 | 348/E5.099 |
| 2014/0344861 A1* | 11/2014 | Berner | H04N 21/4826 | 725/46 |
| 2014/0359647 A1* | 12/2014 | Shoemake | H04N 21/6582 | 725/10 |
| 2015/0067724 A1* | 3/2015 | Johnson | H04N 21/4668 | 725/32 |
| 2015/0365722 A1* | 12/2015 | Oztaskent | G06F 16/7834 | 725/18 |
| 2016/0150294 A1* | 5/2016 | Phatak | H04N 21/4126 | 725/23 |
| 2016/0227266 A1* | 8/2016 | Shaw | H04N 21/4384 | |
| 2016/0249115 A1* | 8/2016 | Lincke | H04N 21/233 | |
| 2017/0180798 A1* | 6/2017 | Goli | H04N 21/2407 | |
| 2018/0007431 A1* | 1/2018 | Sidhu | H04N 21/42203 | |
| 2019/0018846 A1* | 1/2019 | Yeo | H04N 21/8358 | |
| 2020/0389705 A1* | 12/2020 | Harris | G06Q 10/10 | |
| 2020/0404365 A1* | 12/2020 | Phillips | H04N 21/4415 | |
| 2021/0037287 A1* | 2/2021 | Ha | H04N 21/4728 | |
| 2021/0084369 A1* | 3/2021 | Neumeier | H04N 21/4394 | |
| 2021/0211779 A1* | 7/2021 | Wu | H04N 21/8455 | |

* cited by examiner

HYBRID DATA COLLECTION SYSTEM TO CREATE AN INTEGRATED DATABASE OF CONNECTED AND DETAILED CONSUMER VIDEO VIEWING DATA IN REAL-TIME

CROSS-REFERENCE TO RELATED APPLICATIONS

This application claims the benefit of provisional patent application, U.S. Pat. App. No. 62/947,093 filed on Dec. 12, 2020, which is hereby incorporated by reference in its entirety.

FIELD OF THE INVENTION

The present invention relates generally to a system and software application used to monitor video content viewing by individual users to create a massive, detailed, database of cross-platform viewer information. More specifically, the present invention is a system and software to collect and integrate multiple data sources and relationships involved in determining both raw and coordinated viewing data both in real-time and historic formats.

BACKGROUND OF THE INVENTION

With the huge growth of content platforms and content options now available to consumers, measuring consumer viewing interest and sentiment levels across all these platforms and content offerings, it has become a complex and expensive option for marketers to get reliable and targetable data for marketing and other strategic purposes. The challenge is to get substantial numbers (millions) of video consumers to commit to sharing individual viewing data.

This system and invention achieves this by creating a social incentive for users to share viewing information with their friends and hence an incentive to download and sign-up for the system application. This is a unique element of the system which permits the device application to also collect multiple additional types of user data related to content viewing in real-time.

Existing solutions for viewing data collection cannot bring together all the various structured and unstructured elements of data currently sought for marketing analysis and advertising needs in real-time. There are also on-going issues with the accurate verification of the user identity related to viewer data obtained from multiple data sources. As a result, almost all this information is only available in the form of aggregated data reports some time (days or weeks) after the viewing has taken place. However, given the importance of just-in-time' marketing strategies now predominant in the digital advertising, it is a huge advantage if complete, verified and multiple platform user viewing data is available live from a single source.

What makes this overall solution and data outputs unique, is the ability of the system to collect and store a broader range of related hybrid and cross-media viewer information instantly, and report all these elements of granular individual user data in real-time. It is essentially a one-stop, real-time hybrid data analytics platform for collecting video viewing and advertising data, and because it is a single source data collection system there are no data verification requirements. In addition, based on numerous market research studies, consumer viewing is primarily influenced[1] by suggestions and recommendations from friends and associates which are a key element of this system. To create accurate, multi-touch data attribution, data from friends' viewing including; their viewing histories, content ratings and recommendations are a necessary component.

[1] In one of our surveys, over 95% of viewers prefer friends' suggestions versus system or platform recommendations The system software collects information from consumer devices including smartphones, PC's laptops, tablets and others via an auto content recognition system which simultaneously combines real-time GPS location information, historical viewing trends and correlation with recognized inserted advertising. The system already has significant information on user demographics collected when the user signs into the system and following this from other actions taken and locations they may visit to view content.

In addition, the system can monitor viewer reactions to content in terms of length of viewing, number of times the user returns to view particular programs and prompted ratings which the user applies to particular viewing content to share with friends.

The system also provides a unique data element which measures user sentiment based on interaction between users and their friends around specific viewed content or programs. To achieve this the system monitors texts and voice communications on the system between specific users and analyzes sentiments, positive and negative in relation to specific viewed content or programs.

Another special feature of the system allows the system software to run targeted programs to create predictive and prescriptive analysis of current user viewing and or advertising spots in real-time. This includes sampling user responses to specific elements of programing or advertising content, friends' groups interactions and associated sentiment analysis.

Problems related to user data verification and or validation are key issues in most data collection systems and involve extra steps including identity graphing (identity mapping) and cause delays. Because this system internally maintains detailed and simultaneous information on individual users via personal profiles, credit card information, mobile phone numbers and universal device identification (UDID) numbers there is no extra requirement for additional user verification.

The system provides a unique hybrid mix of user viewing data in various sought-after formats, all in-real-time. In addition, all the viewing data information derives from a single source via the integrated device application and system user profiles. This includes user demographics updated by usage and location information, linked friends and related information, content viewing (and history) information, sentiment viewing analysis, ratings and recommendations from users and their friends, multi-type data aggregations, integrated data analysis and predictive and prescriptive analysis outputs.

SUMMARY OF THE INVENTION

Accordingly, it is an aspect of the present invention to provide a software system and device applications to collect, record, analyze and report a wide range of hybrid data information related to consumer viewing of video content from all content networks across all types of viewing apparatuses. This includes, but is not limited to: user name and address information, user demographics, user device information and UDID numbers, current location, content titles and other content details, viewing times including start and finish, times viewed (repeats), overall viewing histories, correlation with friends viewing, program ratings from both automatic and consumer inputted scores and sentiment analysis rankings, all from an individual, unique and verified source for each user.

Through direct marketing and other online user acquisition methods, consumers are encouraged to download application software onto their smartphone or other viewing related devices and use the system software to interact with friends around their existing video viewing and to share their viewing histories, comments, program rating and recommendations with their friends. In particular, because of the social networking features of the system's consumer applications and the need to monitor, manage and share viewing information between users, the System collects a very large amount of information on individual video viewing across all content platforms and or networks which the user may utilize (including broadcast, cable, satellite and on-line).

In a preferred embodiment of the invention, once users register and set up their personal options, they go into the system to select friends from their current friends' lists and invite them to join. From this point on, all viewing information, ratings and recommendations are shared with all members of the friends' group. Each member can also communicate in-app via voice and text communications with one or more of their friends (other related users) at any time.

Embodiments of the invention utilize applications downloaded and installed on a smartphone or other computer-based consumer device including PC's, laptops, tablets and connected TV's. When a user signs up for the social viewing application, the system creates an initial data profile for the user including name, address, gender, content viewing platforms and credit card validation.

Subsequently, when the user begins to watch video or television content, the application starts monitoring user viewing and utilizing an automatic content recognition system based on content fingerprinting techniques automatically identifies what is being watched. The system performs fingerprint comparisons tied into extensive program and network databases to determine detailed information about content being viewed including program titles, series and season information, viewing platform, and responds with this viewing data to the device application. It also identifies specific advertising content delivered as part of the content stream. This core information along with additional information derived by the system is tagged by user and recorded on large-scale computer readable database servers. The viewing data is also shared with other related users (friends) and displayed on these users' devices.

In another embodiment of the present invention, the system incorporates automatic and semi-automatic ratings options for scoring each program viewed by user. This permits the system to create a number of alternate ratings for viewed programs which are simultaneously shared with friends on the network.

According to a further embodiment of the system, the system software has the facility to produce detailed prescriptive and predictive analysis and reports based on criteria which are manually inputted. This tool can operate in real-time to test and focus on consumer viewing attitudes across different demographics, platforms and geographic locations to produce outputs and reports. It can also leverage the system's artificial intelligence capabilities to investigate and cross reference results.

Embodiments of the system also monitor in-application communications via texting and voice channel communications to identify reactions to specific programs in real-time. This software uses key-word analysis and artificial intelligence to identify the number and frequency of comments and their direction (positive or negative sentiments) in connection with the specific viewed content.

As an individual uses the system over time, the system develops extensive histories of personal viewing habits, friend's habits and viewing ratings and recommendations. This includes the unique comparison of friends' viewing with that of an individual user to create a comparative viewing index. All this information is used to classify individual users into specific viewer categories for analysis. The data includes not only individual programs and content, but also genres and other specific classifications developed by the system software based on viewer and friends actual viewing.

In a common embodiment of the invention, the system software monitors, links and verifies the identity of any user through the user's smartphone device. This includes: personal and device information, email addresses, credit card information, mobile phone numbers, mobile device identification (UDID) numbers and home location. Therefore, there is no requirement for additional identity (or device) graphing procedures to ensure that an individual's data is linked directly to each consumer's real identity to a near 100% degree of accuracy. The system thereby creates a multi-touch data attribution model across all the data types which are collected from the application software and the consumer device.

In a common embodiment of the system, software on cloud based servers manages all aspects of the consumer service including the control of the consumer device: a) to modify and change inputs and outputs, b) sharing viewing information between users, c) establishing and running the communications links between the various users, and d) the control and management of significant data collected and associated with users.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED DESCRIPTION OF THE INVENTION

A better understanding of the disclosed embodiments will be obtained from the following detailed descriptions and accompanying illustrations. All illustrations of the drawings are for the purpose of describing selected versions of the present invention and are not intended to limit the scope of the present invention.

Embodiments of the present invention are directed to providing systems and software, including applications installed on user smartphones, PC's, laptops, tablets and other similar devices, to collect, to combine and analyze large volumes of hybrid user data obtained from user's viewing of video content and advertising. Because of the social nature of the system's consumer applications and the requirement to monitor, manage and share consumer viewing information between users, the system collects large amounts of detailed information on individual video viewing across all content platforms (including broadcast, cable, satellite and on-line systems). The software on the consumer devices is linked via internet protocol networks to multiple cloud-based servers to transfer to and from these servers in real-time.

In embodiments of the current invention, social sharing of viewing information with friends encourages users to use the system regularly and invite more friends to install the software application on their device and join them on the network. In this way the numbers of users (panel sizes) will continue to grow organically to provide more and more viewing data information to the system data servers for analysis and outputs.

Figure 1:
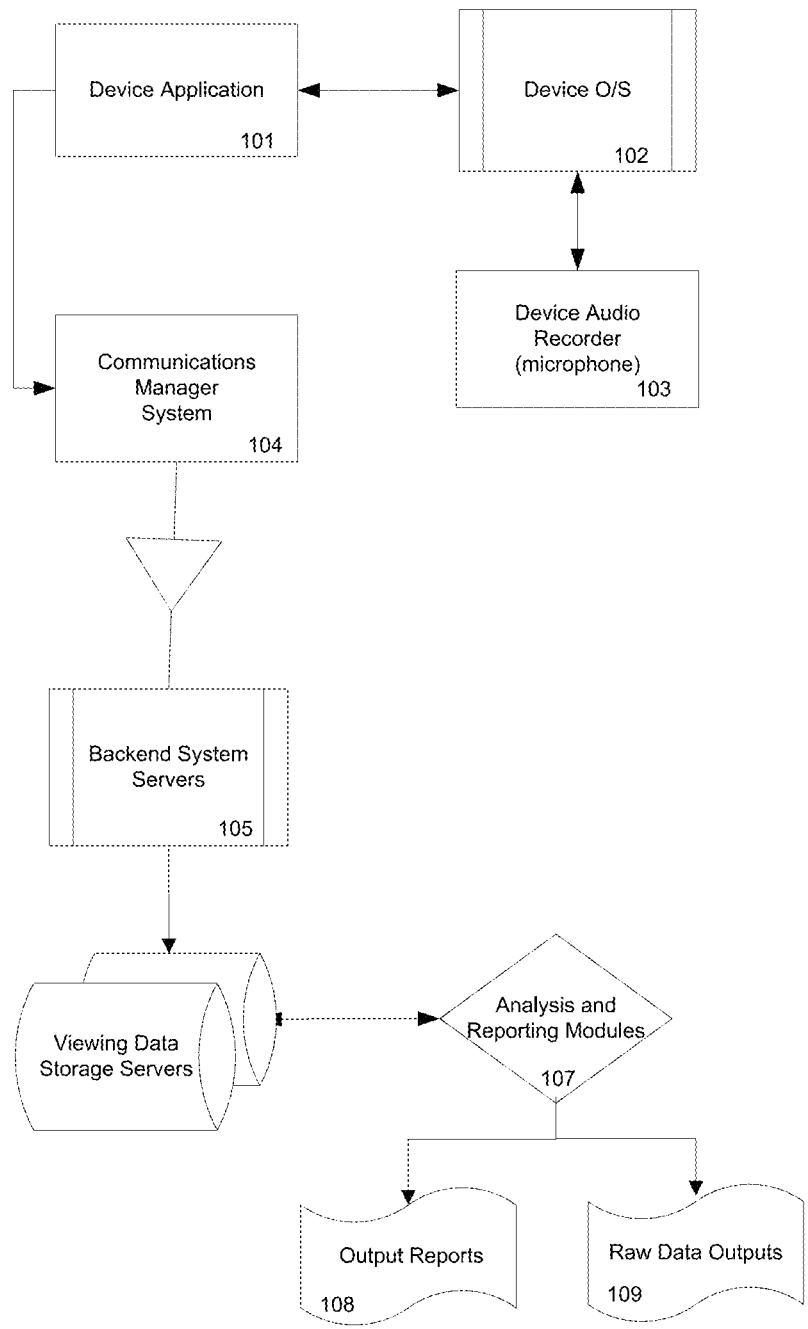
FIG. 1 is a summary process flow diagram showing an exemplary method in accordance with an embodiment of the present invention.

Turning now to FIG. 1, an exemplary embodiment of the key elements, devices and data systems, in accordance with an embodiment of the present invention, is shown. According to an embodiment of the invention, the system incorporates a consumer application, [101], downloaded and installed on the consumer device which can include smartphones, PC's, tablets, smart TV's and TV connected equipment. This is integrated with the device operating system, [102], and the device audio recorder (microphone), [103]. In this embodiment the device is connected to cloud servers via a communications manager system, [104], and to the main backend systems servers, [105], as well as data storage servers, [106]. There are also software systems to analyze and create data outputs in step [107] to produce data outputs for reports in step [108] and large scale raw data transfers in step [109].

According to an embodiment of the present invention, when a user signs up for the social viewing application, the System creates an initial data profile for the user including name, address, gender, content viewing platforms and credit card validation. It also creates tagged files to process and stores data derived from the user's viewing of video content material in computer readable memory in system databases. After users register and set up their personal options, they are prompted to also select friends from their current friends' lists and invite them to join their "viewing friend's group". From this point on, all viewing information, ratings and recommendations are shared with all members of the connected friends' group via internet protocol network links to each users' devices According to an embodiment of the present invention, once users have provided the required profile information and begin to watch any television or video content (including advertising), the system begins continuously monitoring user viewing using automatic video content recognition systems based on audio fingerprinting technology.

In a key embodiment of the present invention, the device application software monitors the consumer's viewing using the device microphone (or other audio track information) to create audio fingerprints (ie. short samples of the audio track data from the viewed program or advertising spot) which are transmitted to the system servers. The system software subsequently performs audio fingerprint comparisons against an extensive database of fingerprinted video content and current advertising video to determine a "match". As part of the process, the system utilizes extensive program, network and or platform metadata qualified by known user information and location to determine a complete program profile of viewed content including program titles, episode and season information and viewing network and or platform.

In a preferred embodiment of the present invention, the program data collected and additional information derived by the system itself, are transmitted in real-time to the primary user's device and the devices of other linked users (friends) on the system. This user information is also collected and tagged to allow additional analysis of friends' interaction around viewing content as well as a comparative viewing index and recorded in large computer readable database servers on the system. In addition, information on advertising content viewed by a user, and identified by the system, is recorded in related database servers and similarly tagged to individual viewing users.

Separately, in an embodiment of the present invention, the application on the consumer device incorporates a number of forms of in-application communications including voice, video and text messaging which are enabled to allow users to interface with each other regarding viewed content, including their views, ratings and program recommendations. The system software monitors and records in-app communications in a computer readable database in real-time. Subsequently, system software uses key-word analysis to identify communications between users in relation to specific viewed video content. These communications are tagged to individual users and user(friends) groups. Utilizing artificial intelligence software and leveraging other system data including individual viewing histories, ratings and program recommendations, the system identifies user communications based on sentiment (positive or negative) and intensity. In doing this the software considers factors such as frequency and regularity of individuals viewing and viewing correlations between friends group members to also develop a separate profile of the user(friends) groups combined interest in a particular program or video content. The sentiment analysis data is recorded in a computer readable database and mapped in real-time to other program data on the database servers. This information can be outputted as reports for defined content or on an aggregate basis for specific video content or other programing.

In a common embodiment of the present invention, the system and device application also incorporate automatic and semi-automatic ratings options for each program being viewed by a user. In the first instance, the automatic ratings engine software uses the actual viewing times in minutes, percentage of total program run-time viewed as well as previous repetitive viewing to produce an estimated individual rating for a particular program. System ratings software then utilizes these inputs to create a combined estimated rating which is tagged to the user and recorded on the system database servers. In the second instance, system users are presented with a manual ratings option via an automatic on-screen prompt (pop-up) on their device once the user has viewed a significant proportion of the program. The user is prompted to manually input a program rating for that show from a ratings scale displayed on the user device. The user ratings response which is likewise recorded on system database servers. In both cases the ratings information is tagged to that particular user and shared with other related users (friends) via the internet protocol network.

According to an embodiment of the present invention, a particular function of the system allows for specific predictive and prescriptive analysis of consumer viewing (and related) data based on control panel inputs. This tool creates a way of estimating consumer reaction (by selected user type or other classification) to specific content or content types in real-time by performing iterative tests on live user data. Artificial intelligence software is further used in this process to create more advanced forecasts and predictive analyses for key use cases and cross reference results against other related user data in the databases.

According to an embodiment of the current invention, as an individual uses the system over time, the system software creates extensive histories of personal viewing habits, friends' viewing habits and viewing ratings and recommendations all recorded and flagged to individual user profiles in the system databases. This information is subsequently analyzed by system software applications to classify individual users into specific viewer categories. The relevant data includes not only show preferences and genres, but also other specific unique viewing classifications which identify particular users.

In a preferred embodiment of the present invention, system applications uniquely monitor and verify the real identity of any user(viewer) via confirmed personal information including location, email addresses, credit cards, mobile phone numbers and unique device identification (UDID) number. There is no requirement for separate identity (or device) graphing procedures to ensure that all data for an individual exactly matches a particular consumer's identity with a near 100% degree of accuracy.

According to the preferred embodiment of the current invention, the huge amounts of hybrid data (both structured and unstructured) collected from user devices as well as related data derived by the system are recorded into one or more database servers. These databases are managed by system management software as well as various analytics and reporting tools to provide both batch data and report outputs including in real-time with direct client online access.

In an embodiment of the system of the current invention, management and reporting software systems are used to provide analysis and reporting of viewing and associated data in real-time. Further, the systems are structured to provide live operator console access to the system to individual clients for viewing and outputting reports of pre-verified consumer and aggregate data. In this regard, a specific and unique use case is the creation of real-time predictive and or prescriptive analysis of current programming on any number of content platforms. Through the system reporting console (which can also be operated via the web by an external third-party), the operator can produce report outputs of current viewing data by user groups for a particular program or programs based on various input criteria. These include, but are not limited to, user demographics, viewing location, histories of prior viewing, individual content ratings for a show and derived sentiment levels of the user and or friends. In this way the system provides sophisticated analysis and reports which show users relative interest, propensity to watch and comparative viewing habits for specific programs. The software systems also provide similar types of analysis for advertising content and related video interstitials.

Figure 2:
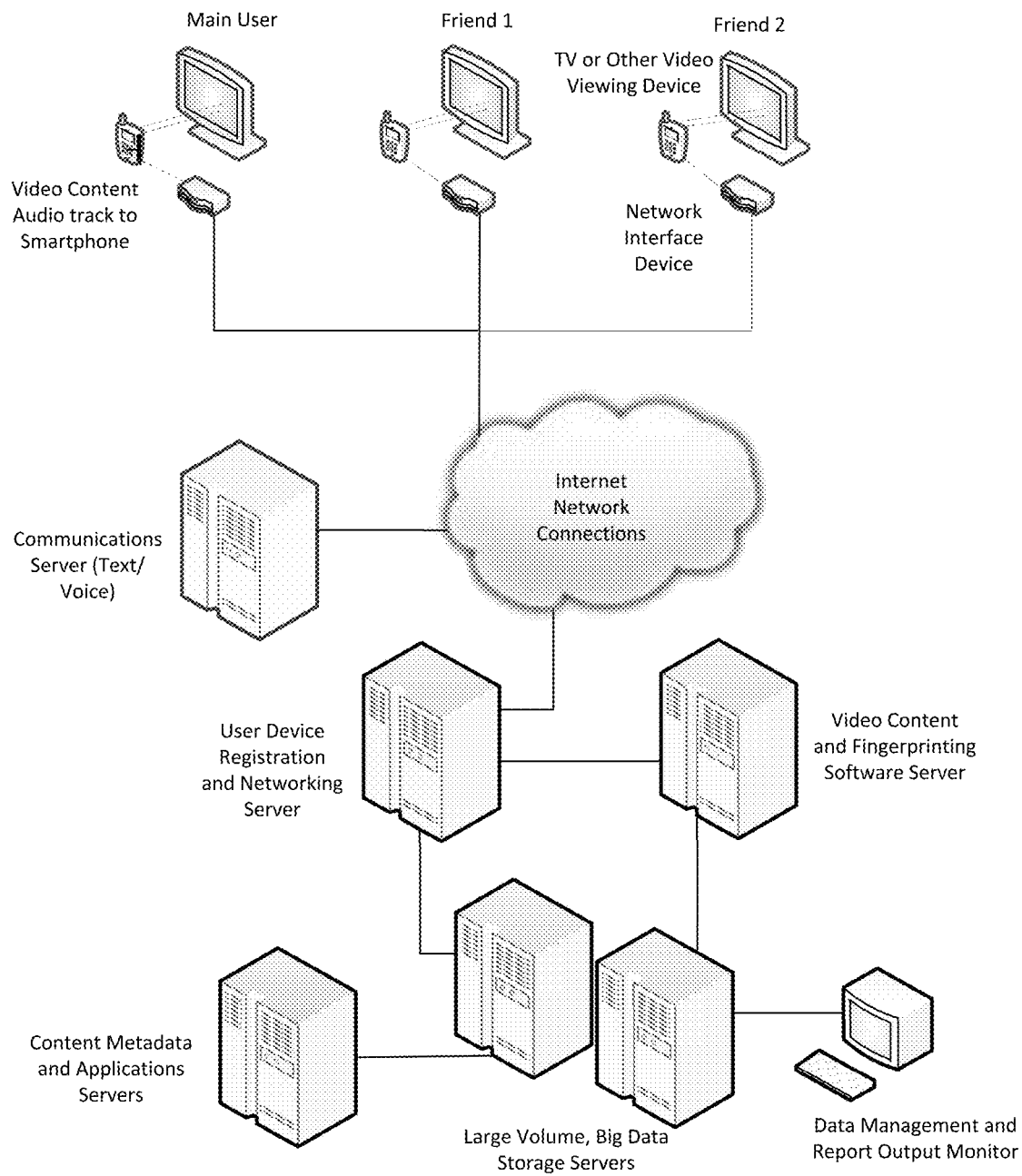
FIG. 2 is a diagram of a typical set-up for the collection of viewing data and the key devices and systems involved in accordance with an embodiment of the present invention.

Turning now to FIG. 2, embodiments of the present invention are shown. These incorporate key elements of the system and backend servers including, but not limited to: smartphones, PC's and tablets, smart TV's or connected TV devices all linked to the internet via wired or wireless connections. These are all linked to backend cloud servers which incorporate multiple layers of device communications and application management software systems including: device application interface and control software, database servers and file management software, consumer text and voice communications databases, artificial intelligence and key word identifications software, data reporting and analytics software, and data lake storage servers. One of ordinary skill in the art would appreciate that the system could be comprised of fewer components or additional components than those displayed in FIG. 2 that is provided for exemplary purposes.

Figure 3:
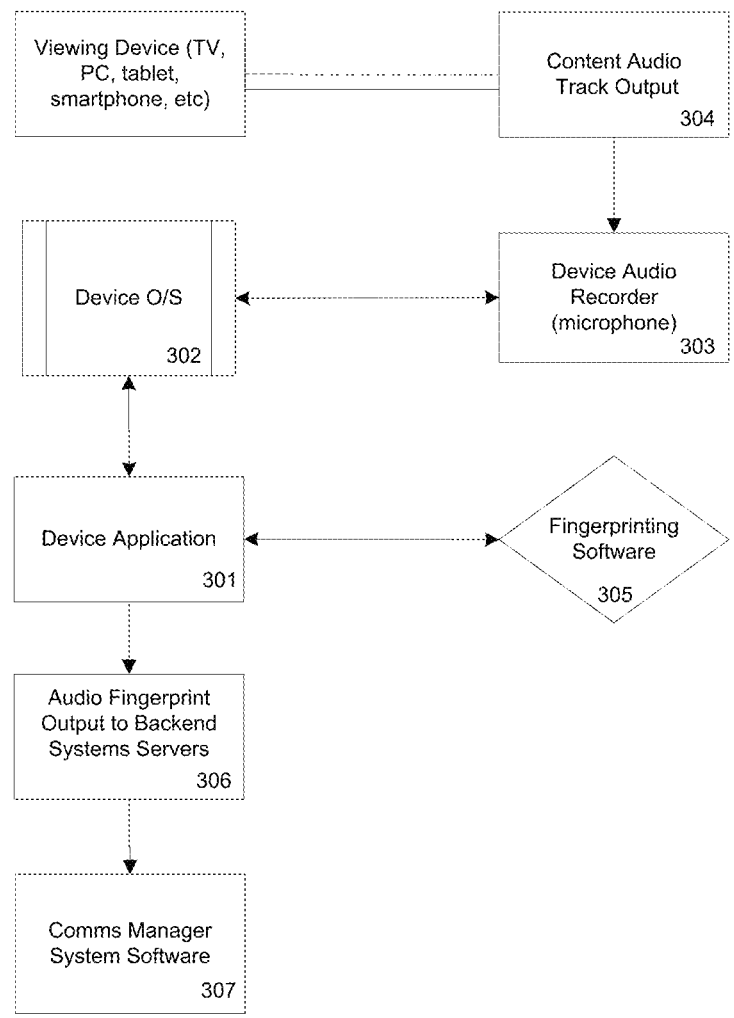
FIG. 3 is a process flow diagram showing an exemplary method in accordance with an embodiment of the present invention.
Figure 4:
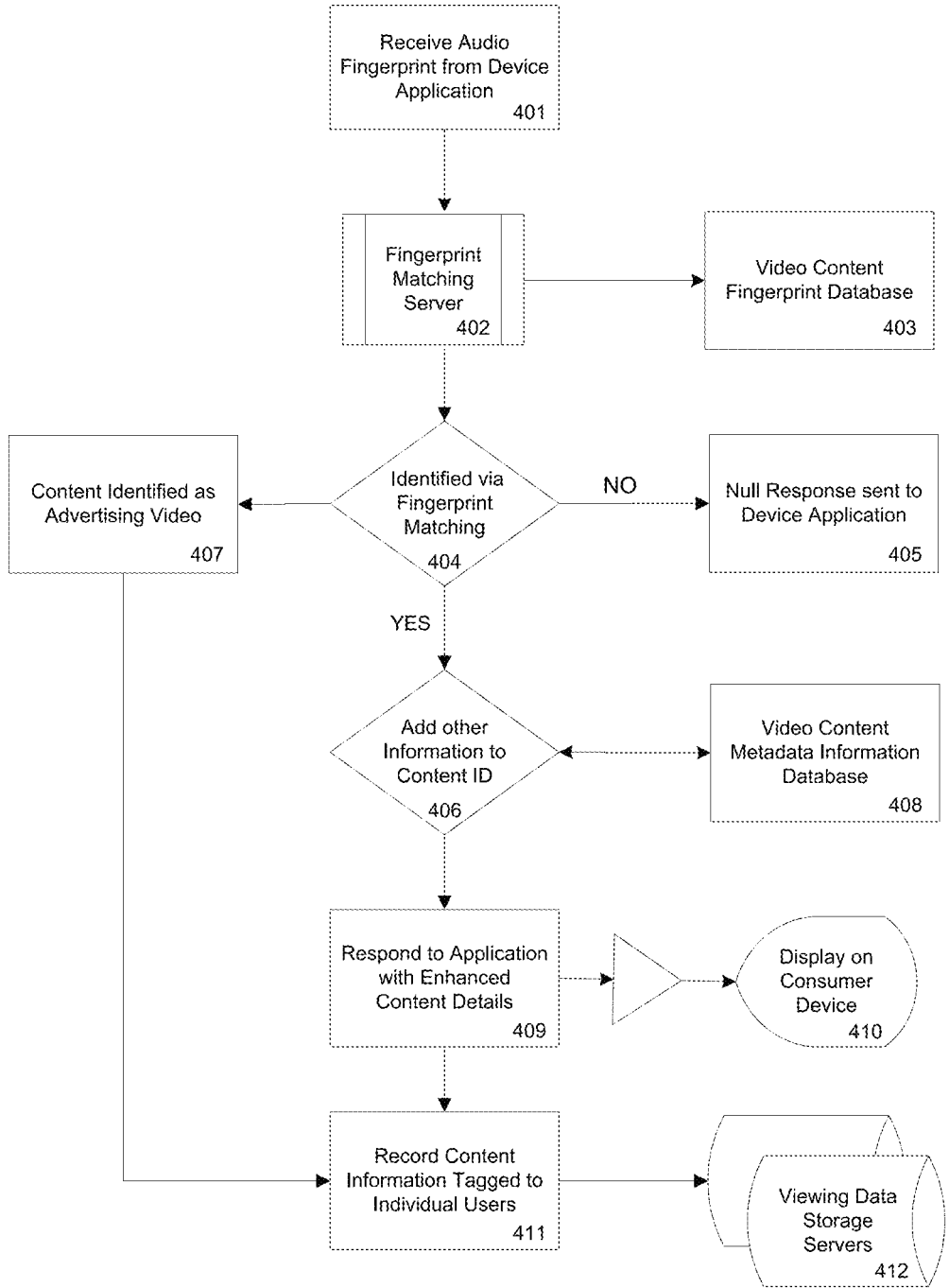
FIG. 4 is a process flow diagram showing an exemplary method in accordance with an embodiment of the present invention.

Turning then to FIG. 3 and FIG. 4, which show embodiments of the present invention. These diagrams represent the elements of the recording of the audio track from the content viewing device and the subsequent identification systems as well as the interfaces between the consumer device app and system backend servers and software. The first stage shown in FIG. 3 relates to the consumer device processes. The application software, [301], connects with the device operating system in step [302] to trigger (open) the device microphone, [304], to record the audio track from content being viewed contemporaneously. Fingerprinting software, [305], then analyzes the audio track and creates fingerprint data which is recorded and sent in step [306] via an internet protocol network to a communications manager system, [307], for forwarding to content identification systems in the backend. In the second stage in FIG. 4, the audio fingerprint data is received from the communications manager server in step [401] and sent to the fingerprint matching server, [402]. Software then matches the audio fingerprints with an extensive library of video content fingerprints on a video content fingerprint database in step [403] to identify a program or other video content or advertising. Based on the content identification output in step [404], if no match is found a null response is returned to the device application, [405]. If content is identified as video programing in step [404], the information, including program title and episode, is then forwarded to other system servers where software incorporates additional program descriptors and information in step [406] via interfaces with a comprehensive content metadata database, [408]. This database includes detailed information on program titles, schedules, networks, platforms, actors and cast as well as season and episode information. The full program data file is then returned in step [409] via an internet protocol network to the device application for output display on the consumer device screen, [410]. Simultaneously the information is forwarded and tagged to individual users in step [411] and recorded on the user viewing history data storage servers [412].

Content identified as advertising video in step [404] is forwarded directly in step [407] to be tagged by user in step [411] and recorded on the system data storage servers, [412].

Figure 5:
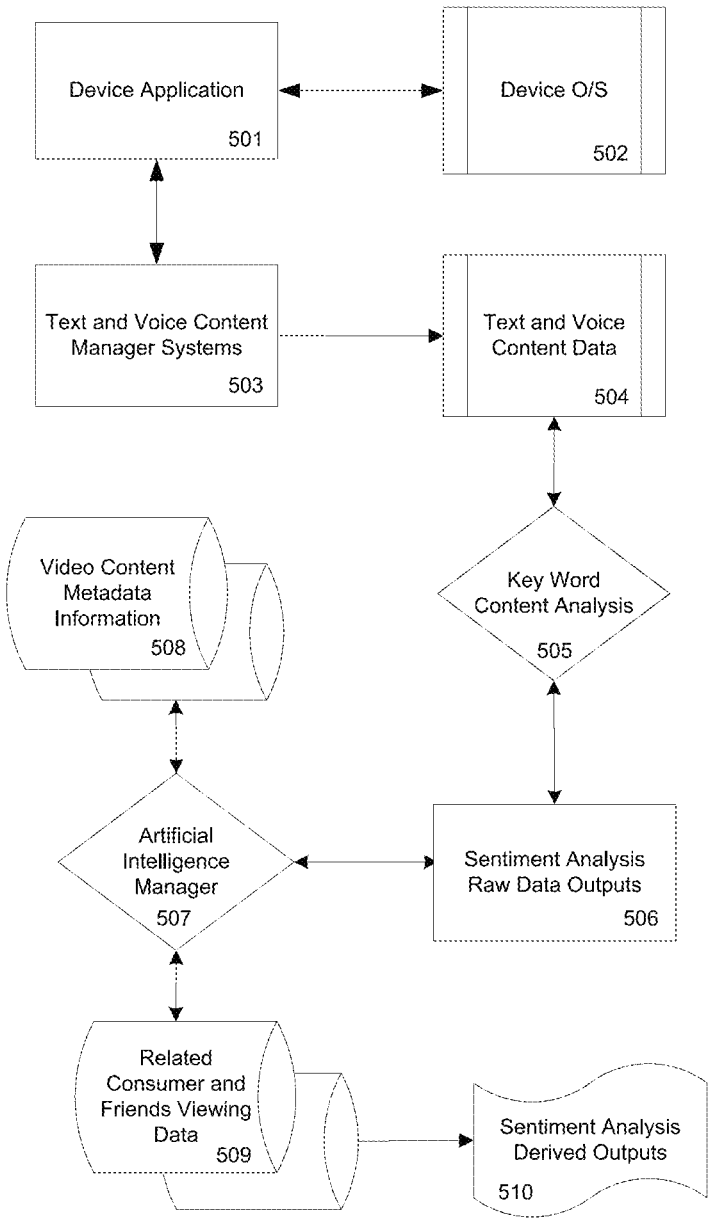
FIG. 5 is a process flow diagram showing an exemplary method in accordance with an embodiment of the present invention.

FIG. 5 represents an embodiment of the invention reflecting the mechanisms for handling and creating sentiment analysis of users(viewers) in terms of positive or negative reactions to specific programs or other video content. The device application, [501], which is integrated with the device operating system, [502], manages text and voice communications between systems users on the system. The text and voice data (reflecting these communications) is stored in a computer readable database, [504], where the data is analyzed by key word software in step [505] to create basic user sentiment data outputs. Artificial intelligence software, [506], which also leverages inputs from user and friends viewing data in step [509], is then applied to the existing sentiment analysis data to derive more sophisticated sentiment analysis outputs and reports, [510].

Figure 6:
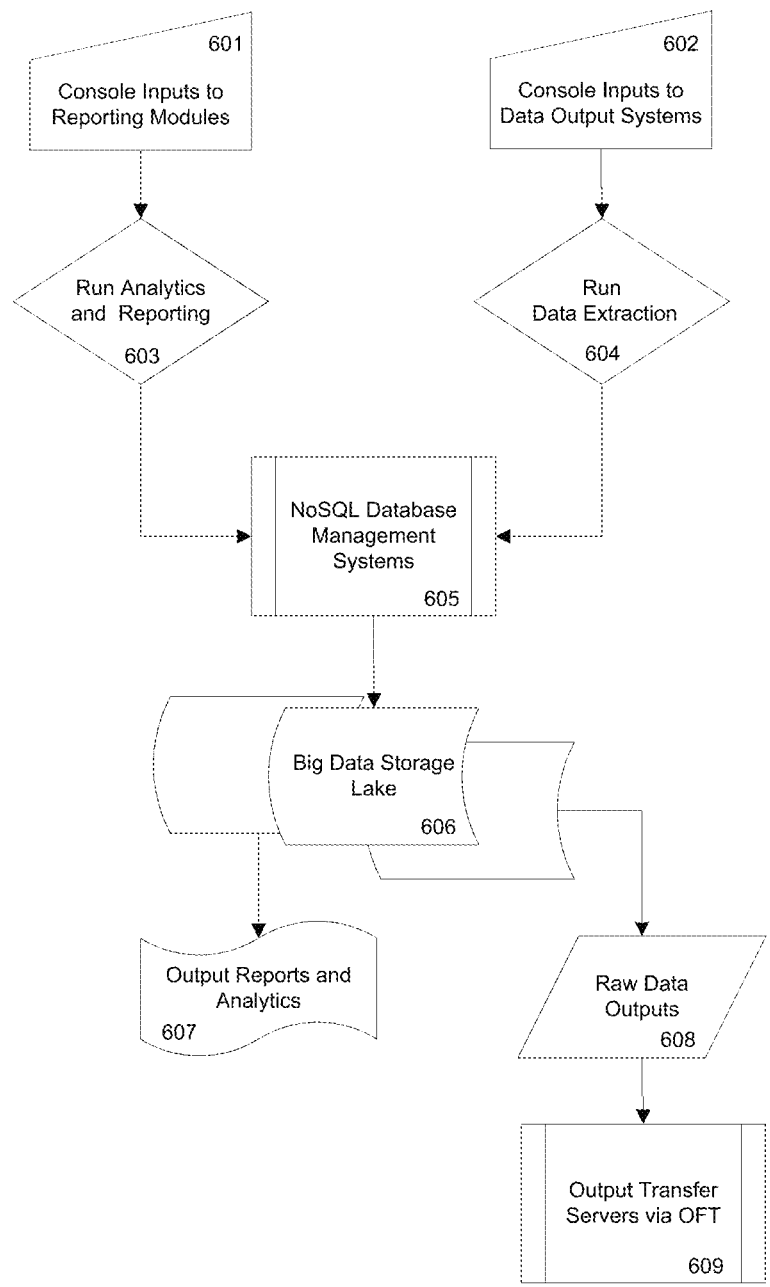
FIG. 6 is a process flow diagram showing an exemplary method in accordance with an embodiment of the present invention

FIG. 6 shows an embodiment of the present invention which represents the processes for handling user and system derived information and creating data outputs including raw, structured and unstructured data files and other secondary reports. In the first instance, inputs to the reporting console, [601], initiate analysis and reporting functionality in step [602] via interfaces with database management software, [603], and the data storage servers to produce reports and other requested forms of outputs, [604]. In the second instance, manual inputs to the data extraction console in step [605] initiate a data sorting and transfer process in step [606] via data management systems, [603], against the data storage servers. Raw data outputs are then formatted in step [607] and transferred to output servers in step [608] utilizing FTP or other transfer formats to transmit data to third party or other remote systems.

While certain novel features of this invention have been shown and described, it will be understood that various omissions, substitutions and changes in the forms and details of the device illustrated and its operation can be made by those skilled in the art without departing from the spirit of the invention.

The invention claimed is:

1. A computer system and software module to collect real-time user video viewing data leveraging links between related systems users (friends) to create new and different descriptive data types all in real-time, comprising:
   an application software module comprising computer executable code on a user mobile device of a user,
   a direct interface between the module and the user mobile device's operating system,
   an internet protocol connection with cloud-based system servers,
   a cloud based server configured to continuously monitor for and receive captured audio samples from the user mobile device, wherein said audio samples are captured from content being viewed by the user,
   a computer readable database for user and system data recording,
   wherein the said software module, said internet protocol connections and database are configured to:
      use system software on the cloud based server to identify the content being viewed in real-time by matching the captured audio sample to an audio track of the content stored in the database, wherein the system software responds to the application software on the user mobile device with viewing information about the identified content including program title, series and season information, content start and end time, content rating, and viewing platform (content provider),
      verify an identity of the user viewing the content via the user mobile device,
      determine user viewership of the content and viewing times based on monitoring the user mobile device,
      automatically share the viewing information with the user's friends while the user is viewing the content by transmitting the viewing information from the cloud based server to each friend's device via internet protocol network links,
      create a comparative viewing index by comparing the user's viewings to a friend's viewings over a set period,
      monitor and analyze text and voice communications between users to create basic user sentiment data related to the content, wherein the sentiment data is used to generate the rating,
      record all data and data types collected to large-scale computer readable databases, tagged by time, individual user, connected user groups, content title and other key elements for analysis and outputs,
   wherein the system monitors for and identifies content being viewed and gathers viewing information about the identified content,
   wherein the viewing information includes content title, content viewing time, content start and end time, content rating, and content provider and is determined for each user any time the user views content,
   wherein the viewing information is automatically shared with the user's designated friends via the cloud based server once the content has been identified,
   wherein the captured audio samples from the user mobile device are captured based on recording sound using the user mobile device at a recording location of the user, and
   wherein the recording location of the user changes as the user carries and moves the user mobile device between different geographic locations.

2. The computer system and software module in claim 1, wherein the said elements are further configured to:
   access key user data directly from the user and related users' (friends') devices, including device types, device identification, contacts information and other related data,
   collect other key user demographic information entered by the individual users in setting up their accounts including credit card verifications from system cloud servers,
   record all data and data types collected to large-scale computer readable databases, tagged by time, individual user, connected user groups, content title and other key elements for analysis and outputs.

3. The computer system and software module in claim 1, wherein the said elements are further configured to:
   use content information received from user devices and system servers to calculate start, finish and elapsed times of current viewing,
   record viewing information and share with related users (friends) on the system,
   leverage this information to encourage users' communications about content, and
   record hybrid data information tagged by content and user on the system database servers for system analysis.

4. A computer system and software to collect other hybrid data types by leveraging voice, text, video and other data communications between users, comprising:
   a software module comprising computer executable code on a user mobile device which is configured to provide direct interface with a user device operating system,
   an internet protocol network connection between user devices and system cloud servers,
   a software application to establish communications between user devices via text, voice or video, a data interface application to share user viewing and other information between related user devices on the system, wherein a rating indicating a respective user's affinity for the content is tagged to the respective user and shared with other related users in the user's groups via the internet protocol connection, a comparative viewing index that compares the respective user's viewings to a friend's viewings over a set period, an application to interface with the user mobile device of the respective user to integrate contacts information of the user mobile device into the system, and a communications module to allow users to initiate communications with related user (friends) tied to current viewing and group membership, and further configured to:

create voice, text and video communications between related users, initiate joint or individual communications linked to specific content being viewed by users, analyze text and voice communications between users to create basic user sentiment data related to the content, wherein the sentiment data is used to generate the rating, create pre-scheduled communications around organized (scheduled) group viewing, share viewing and other related information between related parties (friends) using the system, wherein the system software identifies content being viewed in real-time by capturing an audio sample using the user mobile device from the content and matching the captured sample to an audio track of the content, wherein the system software responds to the respective user's mobile device with information about the identified content including program title, series and season information, content rating, and viewing platform, and record all types of communications information (data) to a backend database server for analysis flagged to individual users and user groups;

wherein the captured audio sample from the user mobile device is captured based on recording sound using the user mobile device at a recording location of the respective user, and wherein the recording location of the respective user changes as the respective user carries and moves the user mobile device between different geographic locations.

5. The software application and systems as in claim 1, wherein one or more of the said software applications and or server software systems are used to create ratings for specific content related to prior viewing and user bias configured to:

send prompt to the user via a user device screen of the user mobile device including any history of prior viewing, and duration of current viewing, request the user input a ratings number for the currently viewed content, forward the data inputs via an internet protocol connection to system servers and, share individual user ratings with related (friends) and record data on the system database servers flagged by user and content identification.

6. The software application and systems as in claim 1, wherein one or more of the said software applications and or server software systems are used to create ratings for specific content configured to:

use the identity of content being viewed from the system to search and retrieve program viewing history from the system database servers, calculate levels of user interest in content based on current viewing, total time watched and overall frequency of viewing, create a system-generated content rating for this video content by alternate weightings of all the key viewing elements and, share individual user ratings which related (friends) and record data on the system database servers flagged by user and content.

7. The system of claim 2, wherein the system collected data is simultaneously verified instantaneously by a number of means, comprising the following steps:

user is verified in the system upon registering on the system through address and credit card verifications, a related user mobile device is authenticated as the source of the user data via universal device identity number (UDID) and telephone number confirmation, data collected and recorded by the system is tagged with related user identification cross-referenced with said verified name, address, phone and device numbers (UDIDs), and all collected user data is pre-verified by the system immediately on receipt.

8. The system of claim 4, further comprising the steps:

utilize key word software to analyze the recorded communications data between users as recorded to determine whether the communication is related to any specific video content viewed by users, apply artificial intelligence software to determine user sentiment indicators for any specific identified content whether positive or negative and the level of intensity thereof and, record the sentiment analysis data elements on the system database servers tagged to users and individual program content.

9. The system of claim 4, wherein the various forms of hybrid data recorded in said system databases can be leveraged to produce more advanced predictive reporting outputs, involving:

operator inputs of requested forms and types of predictive data analysis required, system software runs data sorts to retrieve required verified data inputs for analysis, and artificial intelligence software analyzes selected data using iterative processing to create requested predictive reports based on both historical and real-time data, and create report outputs based on pre-verified data in near real-time.

10. The system of claim 9, further comprising:

operator inputs requested forms and types of predictive data analysis required, system accesses verified data from system databases and live data feeds from user devices to create data pool for analysis, artificial intelligence software functionality to perform high velocity, real-time prescriptive reports to assess specific user viewing reactions and, the report output is created by the system rapidly based on pre-verified data.

11. The computer system and software module of claim 1, wherein the system identifies advertising content delivered as part of a content stream.

12. The computer system and software module of claim 1, wherein the content being viewed is a live TV broadcast.

13. The computer system and software module of claim 1, wherein the recording location of the user changes contemporaneously with the user's location as the user carries and moves the user mobile device between different geographic locations.

14. The computer system and software module of claim 1, wherein monitoring and analyzing text and voice communications between users includes monitoring and analyzing texts sent in-application via the application software module using the user mobile device.

15. The computer system and software module of claim 1, wherein verifying the identity of the user viewing the content via the user mobile device includes using at least one of a phone number or a UDID of the user mobile device.

16. The computer system and software module of claim 1, wherein the user's designated friends are selected by the user from a current friends list stored on the user mobile device that is a smartphone or a tablet.

17. The computer system and software of claim 4, wherein recording sound using the user mobile device at the recording location of the respective user includes recording sound using a microphone of the user mobile device that is a smartphone or a tablet of the respective user.

18. A computer system and software module to collect real-time user video viewing data leveraging links between related systems users to create new and different descriptive data types all in real-time, comprising:
  an application software module comprising computer executable code on a smartphone of a user,
  a direct interface between the module and the smartphone's operating system, an internet protocol connection with cloud-based system servers,
  a cloud based server configured to continuously monitor for and receive captured audio samples from the smartphone, wherein said audio samples are captured from content being viewed by the user,
  a computer readable database for user and system data recording,
  wherein the said software module, said internet protocol connections and databases database are configured to:
    use system software on the cloud based server to identify the content being viewed in real-time by matching the captured audio sample to an audio track of the content stored in the database, wherein the system software responds to the application software on the smartphone with viewing information about the identified content including program title, series and season information, content start and end time, content rating, and viewing platform,
    verify an identity of the user viewing the content via the smartphone,
    determine user viewership of the content and viewing times based on monitoring the smartphone,
    automatically share the viewing information with user's friends while the user is viewing the content by transmitting the viewing information from the cloud based server to each friend's device via internet protocol network links,
    create a comparative viewing index by comparing the user's viewings to the user's friends' viewings over a set period,
    monitor and analyze text and voice communications between users to create basic user sentiment data related to the content, wherein the sentiment data is used to generate the rating,
    record data and data types collected to large-scale computer readable databases, tagged by time, individual user, connected user groups, content title and other key elements for analysis and outputs,
    wherein the system monitors for and identifies content being viewed and gathers viewing information about the identified content,
    wherein the viewing information includes content title, content viewing time, content start and end time, content rating, and content provider and is determined for each user as the user views content,
    wherein the viewing information is automatically shared with the user's designated friends via the cloud based server once the content has been identified,
    wherein the captured audio samples from the smartphone are captured based on recording sound using the smartphone at a recording location of the user,
    wherein the recording location of the user changes contemporaneously with the user's location as the user carries and moves the smartphone between different geographic locations, and
    wherein the user's designated friends are selected by the user from a current friends list stored on the smartphone.

19. The computer system and software module of claim 18, wherein verifying the identity of the user viewing the content via the smartphone includes using at least one of a phone number or a UDID of the smartphone.

20. The computer system and software module of claim 18, wherein recording sound using the smartphone at the recording location of the user includes recording sound using a microphone of the smartphone.

* * * * *